Jan. 5, 1943.                F. GEISE                    2,307,500

PROTECTIVE RELAY SYSTEM

Filed Oct. 30, 1940

WITNESSES:
C. J. Weller.
F. P. Lyle

INVENTOR
Friedrich Geise.
BY O. B. Buchanan
ATTORNEY

Patented Jan. 5, 1943

2,307,500

UNITED STATES PATENT OFFICE 2,307,500

PROTECTIVE RELAY SYSTEM

Friedrich Geise, Berlin-Karlshorst, Germany, assignor to Westinghouse Electric & Manufacturing Company, East Pittsburgh, Pa., a corporation of Pennsylvania Application October 30, 1940, Serial No. 363,455
In Germany June 10, 1939

5 Claims. (Cl. 175—294)

The present invention relates to protective relay systems, and more particularly to a pilot wire relay system which requires only two pilot wires.

In pilot wire relaying systems for the protection of electrical transmission lines, the presence of a fault in a protected section of the line is determined by comparing the current or voltage conditions at opposite ends of the protected section, and the system is thus enabled to distinguish between internal faults in the protected section and external or "through" faults. In order to make this comparison, the relaying equipment at opposite ends of the protected line section is connected together by pilot wires which extend from one end to the other of the section.

In most types of pilot wire systems, three pilot wires are required. Thus, in one well-known type of system, for example, the current transformers at opposite ends of a protected line section are connected together in series by means of two pilot wires, while differential relays at opposite ends of the section are connected in a bridge circuit by means of a third pilot wire. It is obviously desirable to reduce the required number of pilot wires since, in many cases, there are only a few communication channels available to serve as pilot wires, and in any case the cost of the installation would be materially decreased if only two wires were needed.

The principal object of the present invention is to provide a protective relaying system of the pilot wire type in which only two pilot wires are required.

A further object of the invention is to provide a pilot wire relaying system in which a relay circuit is employed at each end of a protected line section for tripping the line circuit breaker at that end, and is connected to the pilot wires only when fault current flows in the line.

A more specific object of the invention is to provide a pilot wire relaying system in which only two pilot wires are utilized to connect the relaying equipment at opposite ends of a protected line section, and having a tripping relay circuit which is connected to the pilot wires only when a fault occurs, together with additional means for preventing tripping of the line breakers on faults external to the protected line section.

Further objects and advantages of the invention will be apparent from the following detailed description, taken in connection with the accompanying drawing, in which.

Figure 1:
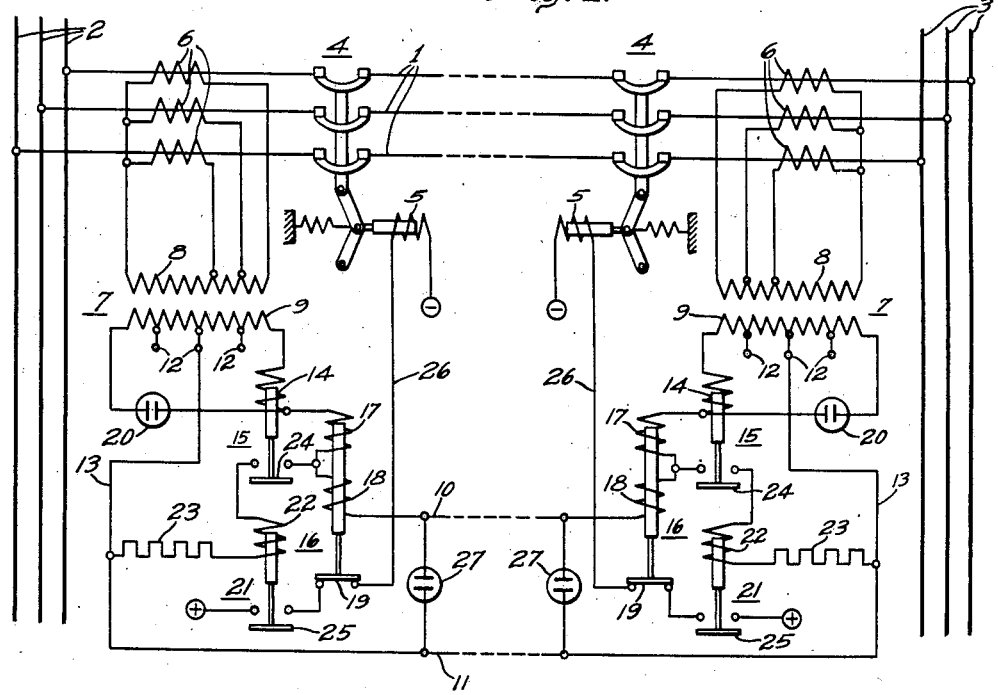
Figure 1 is a wiring diagram showing one embodiment of the invention.

Figure 1 shows a pilot wire relaying system in accordance with the present invention applied to the protection of a three-phase transmission line section 1, which extends between suitable sectionalizing points indicated by the adjacent line sections or bus bars 2 and 3. A circuit breaker 4 having a trip coil 5 is provided at each end of the line section for disconnecting it from the adjacent sections.

The relaying equipment at both ends of the line section is identical and it will be described in detail from one end only. Current transformers 6 are provided at each end of the line section 1 in the usual manner to energize the relaying system, and they are connected in any suitable or usual manner to a single-phase auxiliary transformer 7. The current transformers 6 are connected to the primary winding 8 of the auxiliary transformer 7, and, as shown in the drawing, they are connected to unequally spaced taps on the primary winding so that a single-phase relaying voltage appears across secondary winding 9 when a fault of any type occurs on the line. The secondary windings 9 of the transformers 7 at opposite ends of the line section 1 are connected together in series by means of pilot wires 10 and 11, which extend from one end to the other of the protected line section. Each of the windings 9 has a plurality of taps, indicated at 12, and the pilot wire 11 is connected to one of these taps by a conductor 13, so that by changing taps the current in the pilot wires may be adjusted to any desired value. The other pilot wire 10 is connected to the secondary winding 9 in series with the operating coil 14 of an over-current relay 15, and also in series with a blocking relay 16. The relay 16 has two operating coils 17 and 18, and it is designed to open its contacts 19 only when current of a predetermined magnitude flows in the same direction through both the coils 17 and 18. A suitable electric discharge device, such as a glow lamp 20, is connected across the entire secondary winding 9 of the transformer 7 and the coil 14 of the relay 15, in order to limit the maximum voltage that may appear across these windings and also to complete the circuit for the coil 14 in certain cases, as will appear hereinafter.

A tripping relay circuit is also provided at each end of the protected line section and is arranged to be connected to the system only when a fault occurs on the line. This relay circuit includes a tripping relay 21 having its coil 22 connected in series with a resistance 23. The relay circuit consisting of the relay 21 and resistance 23 is connected at one end to the conductor 13, and its other end is connected between the coils 17 and 18 of the blocking relay 16 whenever the relay 15 is energized and closes its contacts 24. The relay 21 has contacts 25 which are connected to complete a circuit through a conductor 26 for energizing the trip coil 5 of the circuit breaker 4 to cause tripping of the breaker. A glow lamp 27, or other suitable type of discharge device, may be connected across the pilot wires 10 and 11 at each end in order to protect the relaying equipment against high induced voltages that may occur on the pilot wires.

The operation of this system is as follows: Under normal conditions, all of the relays at each end of the line section 1 are deenergized and are in the position shown in the drawing, the relays 15 and 21 having their contacts open while the relay 16 has its contacts closed. If a fault occurs on the line external to the protected line section 1, fault current flows through the line section and is in the same direction at both ends. A single-phase relaying-quantity, in this case in the form of a voltage, appears across each of the secondaries of the transformers 7, and since the fault current is flowing in the same direction at both ends of the line section, these voltages will be in the same direction. The secondaries 9 of the transformers 7 are connected in series through the pilot wires 10 and 11, and a relatively large circulating current will therefore flow through these wires. This current traverses the coil 14 of the overcurrent relay 15 and causes it to close its contacts 24, thus connecting the tripping relay 21 across the transformer 7 so that it is energized and closes its contacts 25. Simultaneously with the operation of the relay 15, however, the blocking relay 16 opens its contacts 19, since a relatively large current is flowing in the same direction through both the coils 17 and 18. The contacts 19 are connected in series with the contacts 25 in the tripping circuit 26, and opening of these contacts, therefore, prevents tripping of the breaker, so that the line section 1 is not disconnected when an external fault occurs.

The resistance 25 is made relatively large compared to the resistance of the pilot wires 10 and 11; for example, it may have a resistance of three times the resistance of the pilot wires. For this reason, the current through the tripping relay circuit is limited so that it is only large enough to operate the relay 21, and the greater part of the current continues to flow through the pilot wires 10 and 11 so that the blocking relay 16 is maintained energized to prevent tripping of the breaker. The discharge device 20 may break down and become conducting to limit the voltage across the winding 9 and the relay coil 14 to a safe value, but operation of the discharge device 20 does not affect the operation of the relay system since the voltage applied to the pilot wires is supplied from one of the taps 12 through the conductor 13.

In case a fault occurs within the protected line section 1, the voltages across the secondaries of the transformers 7 at opposite ends of the section oppose each other, and no current or only a very small current flows in the pilot wires 10 and 11. The voltage across the entire secondary winding 9 of each transformer, however, is high enough to cause the discharge device 20 to become conducting, and a local circuit is thus completed through the discharge device 20 and the relay coil 14, causing the overcurrent relay 15 to close its contacts 24 and connect the tripping relay circuit across the transformer. As soon as the relay 15 closes its contacts, current flows through the coil 17 of the relay 16, contacts 24 of the relay 15, operating coil 22 of the relay 21, the resistance 23, and conductor 13, back to the transformer 7. Thus, the relay 21 is energized and closes its contacts 25 to cause immediate tripping of the circuit breaker 4. Since there is little or no current flowing in the pilot wires, there will be substantially no current in the winding 18, and the relay 16, therefore, is not energized, so that its contacts 19 remain closed, thus permitting immediate tripping of the circuit breaker 4. If the fault current at one end of the line section 1 is much larger than at the other end, it may happen that the breaker at that end will be tripped first, but in any case both breakers will always be tripped in a positive and reliable manner.

In case the fault current is supplied to an internal fault from one end only of the line section 1, the relay 15 at that end of the line section will be energized and close its contacts in the manner just described to energize the tripping relay 21 and cause tripping of the circuit breaker at that end. Even though there is no opposing voltage across the transformer 7 at the opposite end of the line section to prevent the flow of current through the pilot wires, there will be only a very small current because of the high impedance of the transformer winding at the opposite end, and thus the current in the relay coil 18 is not sufficient to energize the blocking relay 16, and it remains deenergized with its contacts 19 closed to permit tripping of the breaker. Thus, only the breaker at the end of the line section from which the fault current is supplied is tripped, and even though there is no opposing voltage at the opposite end of the pilot wires to prevent the flow of current in them, the blocking relay 16 is not actuated. This result is made possible by the fact that the tripping relay circuit at each end is energized only when fault current flows through the line section at that end. If the tripping relay circuit were permanently connected at each end, it is apparent that in case the fault current were supplied from one end of the line section only, a current would flow through the pilot wires and through the tripping relay circuit at the other end, and thus the blocking relay at the first end of the line section would be energized and prevent tripping of the breaker. By connecting the tripping relay circuit only when a fault current flows at its end of the line section, this difficulty is avoided and operation of the blocking relay is prevented.

Figure 2:
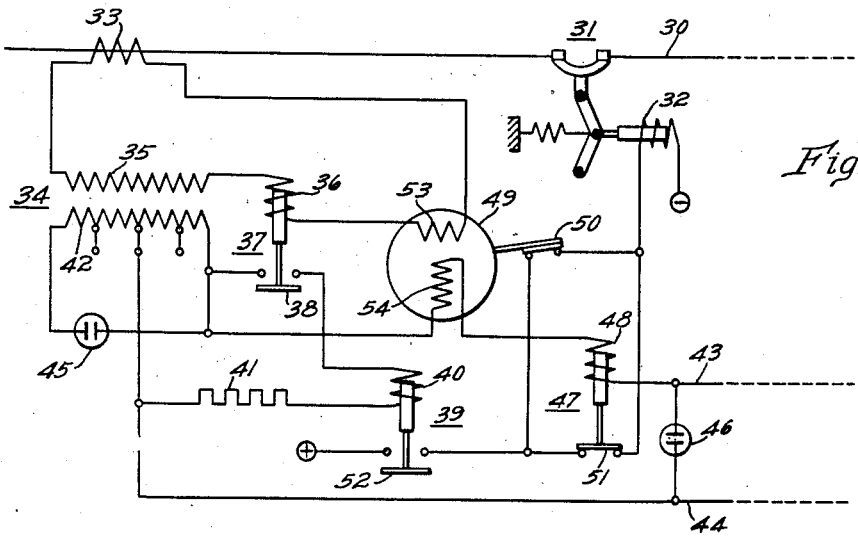
Fig. 2 is a wiring diagram showing another embodiment of the invention.

Fig. 2 shows another embodiment of the invention which is particularly suitable when the protected line section is of great length, since it will operate satisfactorily with pilot wire currents as low as a few milliamperes. Fig. 2 shows the relaying equipment at one end only of a protected line section 30, only one phase being shown. As before, the line section has a circuit breaker 31 at each end with a trip coil 32.

A current transformer 33 is provided at each end of the line section 30 and is connected to an auxiliary transformer 34, which may be similar to the transformer 7 described above. The primary winding 35 of this transformer is connected in series with the operating coil 36 of an overcurrent relay 37, the contacts 38 of which are arranged to connect a tripping relay circuit across the transformer 34 when fault current flows in the line 30. The tripping relay circuit includes a tripping relay 39 having an operating coil 40 which is connected in series with a resistance 41 to a tap on the secondary winding 42 of the transformer 34. As before, the secondaries 42 of the transformers 34 at opposite ends of the line section are connected in series through pilot wires 43 and 44. A glow lamp, or other suitable discharge device 45, is connected across the secondary winding 42 to limit the voltage across it, and a discharge device 46 of any suitable type may be connected across the pilot wires to protect the relaying equipment from induced voltages that may appear on them.

Blocking means are also provided to prevent tripping of the breaker 31 on faults external to the protected line section 30. The blocking means consists of an overcurrent relay 47, which has its operating coil 48 connected in series with the pilot wire 43, and a wattmeter element 49. The contacts 50 of the wattmeter element 49 and the contacts 51 of the current relay 47 are connected in parallel between the contacts 52 of the tripping relay 39 and the trip coil 32 of the line breaker 31, so that when the contacts of both the wattmeter element 49 and the current relay 47 are opened, tripping of the breaker is prevented. The voltage coil 53 of the wattmeter element 49 is connected in series with the primary 35 of the transformer 34 and coil 36 of the relay 37. The current coil 54 of the wattmeter element is connected in series with the pilot wire 43, and the wattmeter element is so adjusted that it opens its contacts when current flows in the same direction in both of the coils, and it is preferably adjusted to operate on a very small current in the coil 54.

It will be apparent that the operation of this system is essentially the same as that described above in connection with Fig. 1. Thus, when a fault occurs external to the protected line section 30, the fault current flowing through the line energizes the relay 37 and causes it to close its contacts 38, thus connecting the tripping relay circuit across the transformer 34 and causing the relay 39 to close its contacts 52. Since the voltages of the transformers 34 at opposite ends of the line section are in the same direction, however, current will flow through the pilot wires 43 and 44, thus causing both the relay 47 and the wattmeter element 49 to open their contacts and prevent tripping of the breaker 31.

In case of an internal fault within the protected line section, the relay 37 is energized in the same manner as before, since its coil is connected to the primary of the transformer 34. Since the voltages of the transformers 34 at opposite ends of the line section now oppose each other, however, no current will flow in the pilot wires, and the relays 47 and 49 remain unenergized with their contacts closed, so that the breaker 31 is tripped as soon as the tripping relay 39 closes its contacts. In case the voltage across the transformer 34 at one end of the line section is greater than at the other, there may be a small current in the pilot wires which will be great enough to cause the wattmeter element 49 at one end of the line section to open its contacts. This current will not be large enough, however, to actuate the relay 47, and since its contacts are in parallel with the contacts 50 of the relay 49, the tripping circuit is not interrupted and the breaker is immediately tripped. In case the fault is supplied from one end of the line section only, the impedance of the transformer at the opposite end will prevent the flow of any substantial amount of current in the pilot wires, and therefore the relays 47 and 49 will not be energized and tripping of the breaker will not be prevented. It will be seen, therefore, that the operation of this embodiment of the invention is substantially the same as that of the previously described embodiment, but that because of the use of the wattmeter element 49 it can be made quite sensitive and thus satisfactory operation can be obtained with very small pilot wire currents, so that this embodiment of the invention is particularly suitable where the protected line section 30 is very long.

It should now be apparent that a pilot wire relaying system has been provided which requires only two pilot wires, and which is very reliable in its action to insure immediate and positive tripping of the line breakers upon the occurrence of an internal fault in the protected line section, and which positively prevents tripping of the breakers in case of a fault external to the protected section.

It is to be understood that although two specific embodiments of the invention have been described for purposes of illustration, it is not limited to the exact arrangements shown, but that various other modifications are possible, and in its broadest aspects, therefore, the invention includes all equivalent modifications and embodiments which come within the scope of the appended claims.

I claim as my invention:

1. A protective relaying system for a section of a polyphase electrical transmission line having circuit interrupting means at each end thereof, comprising transformer means including a secondary at each end of the protected line section for producing a single relaying voltage, pilot wires connecting said secondaries in series, a relay circuit at each end of the line section effective when actuated to cause tripping of the circuit interrupting means at that end, means at each end of the line section, energized by the associated secondary, for actuating said relay circuit when fault current flows in the line, and means for preventing tripping of the circuit interrupting means when the fault is external to the protected line section.

2. A protective relaying system for a section of a polyphase electrical transmission line having circuit interrupting means at each end thereof, comprising transformer means including a secondary at each end of the protected line section for producing a single relaying voltage, pilot wires connecting said secondaries in series, a relay circuit at each end of the line section effective when actuated to cause tripping of the circuit interrupting means at that end, an overcurrent relay connected in series with said secondaries and pilot wires, at each end of the line section for actuating the relay circuit at that end, a predetermined-response electric discharge device connected across a secondary and an overcurrent relay at one end of the protected line section, said electrical discharge devices being operable, in response to fault current in said line section, to operate said overcurrent relay, whereby said relay circuit is actuated, and a blocking relay at the end of the line section having the said electrical discharge device, connected in series with the pilot wires for preventing tripping of the circuit interrupting means when current flows in the pilot wires.

3. A protective relaying system for a section of a polyphase electrical transmission line having circuit interrupting means at each end thereof, comprising transformer means including a primary and a secondary at each end of the protected line section for producing a single relaying voltage, pilot wires connecting said secondaries in series, a relay circuit at each end of the line section effective when actuated to cause tripping of the circuit interrupting means at that end, an overcurrent relay connected in series in the primary circuit of said transformer means for actuating said relay circuit when fault current flows in the line, a wattmeter element having a first coil connected in series with said overcurrent relay and a second coil in series with the pilot wires, said wattmeter element having contact means operable when current flows in said second coil, and a relay, under control of said contact means, connected in series with the pilot wires, said wattmeter element and said last-mentioned relay being jointly effective to prevent tripping of the circuit interrupting means when current flows in the pilot wires.

4. A protective relaying system for a line-section of a polyphase electrical apparatus having circuit-interrupting means in the power lines at each end thereof, comprising, at each end of said electrical apparatus, transformer means having a magnetic circuit and a secondary coupled thereto for magnetically combining electrical quantities representative of line conditions at the associated end of the electrical apparatus, to produce a single electrical relaying-quantity in said secondary representative of line-conditions at that end; a pair of pilot wires serially connecting the said secondaries; a relay circuit at each end of the electrical apparatus, operative, when actuated, to cause tripping of the associated circuit-interrupting means; potentializing means at each end of said electrical apparatus, energizable by an excess value of said single electrical relaying-quantity in the secondary thereat, for actuating said relay circuit; and blocking means energized by the single electrical relaying-quantities at both ends of the electrical apparatus acting in combination through said pilot wires for preventing under normal conditions and external fault conditions in said electrical apparatus actuation of either of said relay circuits by the associated potentializing means, but permitting actuation of the relay circuit at an end or ends of said electrical apparatus at which an excessive electrical relaying-quantity is produced by an internal fault in said electrical apparatus.

5. A protective relaying system for a line-section of a polyphase electrical apparatus having circuit-interrupting means in the power lines at each end thereof, comprising, at each end of said electrical apparatus, transformer means having a magnetic circuit and a secondary coupled thereto for magnetically combining electrical quantities representative of line conditions at the associated end of the electrical apparatus, to produce a single electrical relaying-quantity in said secondary representative of line-conditions at that end; a pair of pilot wires serially connecting the said secondaries; a relay circuit at each end of the electrical apparatus, operative, when actuated, to cause tripping of the associated circuit-interrupting means; potentializing means at each end of said electrical apparatus, energizable by an excess value of said single electrical relaying-quantity in the secondary thereat for actuating said relay circuit; and blocking means energized by the single electrical relaying-quantities at both ends of the electrical apparatus acting in combination through said pilot wires for preventing under normal conditions and external fault conditions in said electrical apparatus actuation of either of said relay circuits by the associated potentializing means, but permitting actuation of the relay circuit at an end or ends of said electrical apparatus at which an excessive electrical relaying-quantity is produced by an internal fault in said electrical apparatus, said potentializing means being of a type which limits the excess value of the last said relaying-quantity.

FRIEDRICH GEISE.